Patented Oct. 1, 1946

2,408,700

UNITED STATES PATENT OFFICE 2,408,700

SYNTHETIC WAX COMPOSITION

Murray M. Sprung, Scotia, N. Y., assignor to General Electric Company, a corporation of New York No Drawing. Application July 16, 1943, Serial No. 495,045

11 Claims. (Cl. 106—287)

The present invention relates to flameproof synthetic wax compositions. It is particularly concerned with synthetic wax-like compositions comprising the reaction product of a halogenated aromatic carboxylic acid or acid halide and a polyamine, preferably a diamine.

Waxy-like materials for use as coatings for coils, lead wires, and similar equipment should be non-inflammable, heat-stable, fusible, and non-toxic, having a melting point above room temperature and preferably between 60° and 100° C., and should impregnate materials such as cotton, asbestos, and glass fibers easily and quickly. The impregnated materials should be flexible and dry to the touch or capable of being rendered dry to the touch on short baking at moderate temperatures, and should possess good electrical properties.

I have found that waxes having these characteristics can be prepared by heat-reacting chlorinated aromatic acids or acid halides with aliphatic (including cyclo-aliphatic) di- or other poly-amines, preferably amines containing from 2 to 6 carbon atoms. The products of such reactions have the chemical nature of chlorinated amides. The non-inflammability imparted to such molecules by the presence of chlorine is enhanced by the presence of nitrogen.

Among the halogenated acids and acid halides which may be used in preparing these combinations are tetrachlorophthalic anhydride, trichlorobenzoic acid, trichloro-benzoyl chloride, chlorinated toluic acid and chlorinated naphthoic acids. All of these acids, which are either mono-carboxylic or ortho-dicarboxylic acids, contain chlorine attached to the aromatic nucleus which enhances their stability greatly over related chlorinated derivatives in which the halogen is attached to an aliphatic radical.

Various aliphatic amines may be used, including ethylene diamine, propylene diamine, tetramethylene diamine, piperazine, hexamethylene diamine, pentamethylene diamine, and 1,2,3-triamino propane.

I prefer to prepare the synthetic waxes by reacting a chlorinated aromatic monocarboxylic acid halide, specifically a chlorinated benzoyl chloride having approximately three chlorine atoms in the aromatic ring, with propylene diamine. These two substances are reacted together in approximately equivalent chemical equivalent proportions, that is, in stoichiometrical proportions or, otherwise stated with particular reference to a chlorinated benzoyl chloride and a diamine, in the ratio of approximately two moles of acid chloride to one mole of diamine. An excess of the amine over stoichiometrical proportions may be used, the excess serving to take up part of the hydrochloric acid formed during the reaction. As the amine hydrochloride so formed is insoluble in the reaction mixture, it is easily removed from the reaction product. Hydrogen chloride is liberated during the reaction between the stoichiometrical proportions of amine and acid halide and amide linkages are formed. The reaction mixture first becomes heated of its own accord so that external cooling is desirable to control the reaction, but later on an external source of heat should be applied. The final temperature of the mass is brought to between 230° and 300° C., preferably to about 240° to 250° C., until there is no substantial change in weight of the reaction mass on further heating. The mass is very fluid and amber colored at this point and, on cooling to room temperature, sets to a soft, solid, waxy mass, which is slightly brittle and exhibits plastic flow. The physical nature of this product varies somewhat with the conditions of preparation. It may be softer or harder and more or less plastic, depending upon the time and temperature of heating.

The physical properties of the product may be modified considerably by incorporation of various solvents and plasticizing agents, etc. Examples of such modifiers which may be added in small amounts without materially altering the flame-resistant properties are trichlorobenzene, dichlorodiethyl ether, acetylene, tetrachloride, acetamide, askarel and tricresyl phosphate.

Mixtures of about 85–92 parts of the chlorinated benzoyl chloride-propylene diamine reaction product and about 15–8 parts tricresyl phosphate constitute soft, putty-like waxes. Asbestos, glass, cotton, or similar materials are impregnated very readily with these waxes by dipping the material in the hot wax or by hot-pressing. A few minutes' baking at a temperature of about 125 to 175° C. then produces a smooth, dry, flexible product. The handling and application of such materials to coils, lead wires and similar equipment is thus greatly facilitated.

Preferably the reaction between the acid and amine is carried out in two stages. Part of the acid or acid chloride is first reacted with the amine until most or all of the water or hydrogen chloride formed during the reaction has been eliminated from the reaction mass. The remaining acid is then added and the reaction carried to the desired end point. For example, 230 parts trichlorobenzoyl chloride are mixed with 59 parts propylene diamine and the mixture warmed, if necessary, to initiate the reaction. The reaction rate is thereafter controlled by immersion of the reaction vessel in an ice bath. During this state it is desirable to hold the temperature of the mass between 0° and 50° C. The reaction product which ordinarily contains a salt-like precipitate is then heated to drive off the hydrogen chloride retained by the precipitate, probably in the form of an addition compound. The precipitate melts during the heating step and at a temperature of 180° C. all of the hydrogen chloride has been driven off. An additional 160 parts of trichlorobenzoyl chloride is then added and the reaction continued with heat until the temperature of the mass reaches 252° C. The product is a soft mass which forms a soft, putty-like wax with tricresyl phosphate or dibutyl phthalate at room temperatures, is fluid at temperatures above 200° C. and is soluble in hot ethyl alcohol, acetone, nitrobenzene, diacetone alcohol, tetrachloroethane, or turpentine.

An amount of chlorinated, phthalic anhydride, equimolecular with the amine specifically tetrachloro phthalic anhydride, can be substituted for the trichloro benzoyl chloride employed in either of the above preparations and the final reaction mass heated in an open vessel until there is no substantial loss in weight with time. The waxy product so obtained is fluid at 200° C. By the addition of small amounts of the usual plasticizers, compositions which are wax-like and pasty at room temperature are obtained.

If desired, the amine-acid reaction product may be prepared in the presence of a small amount of a high boiling solvent. For example, 28.4 parts tetrachlorophthalic anhydride was reacted with 7.4 parts propylenediamine (that is, with these reactants in approximately equimolecular proportions) in the presence of 50.0 parts acetamide. The ingredients were heated together in an open vessel until the weight loss coincided with that required for complete reaction of the anhydride and the diamine. About 19.9 parts of tricresyl phosphate was added while the reaction mass was still hot. The resultant mass was cooled to form a pale yellow, soft wax. An asbestos strip was impregnated with this waxy composition, and then heated to a temperature high enough to remove the acetamide. A smooth, flexible, flame-resistant coating was thereby obtained.

The plasticized or unplasticized waxy masses obtained in accordance with my invention when applied to an asbestos base and heated at about 170° C. for a short time become smooth and dry to touch and are exceedingly flame-resistant. The plasticizer content of the plasticized masses generally should not exceed 25 percent and preferably should comprise from 5 to 25 per cent by weight based on the weight of the acid-amine reaction product.

The products of this invention are characterized by outstanding non-inflammability, heat-stability, abrasion resistance, non-volatility, ease of impregnation, and ease of handling. They are adapted for general use wherever a flame-proof, stable, abrasion-resistant impregnant or coating material is required, as, for example, a coating for lead wires, asbestos coverings, and the like.

What I claim as new and desire to secure by Letters Patent of the United States, is:

1. The wax-like heat-reaction product of substantially stoichiometrical proportions of an aliphatic polyamine and a halogenated aromatic compound selected from the class consisting of nuclearly halogenated aromatic monocarboxylic and ortho-dicarboxylic acids and acid halides.

2. A wax-like product obtained by heat-reacting substantially stoichiometrical proportions of (1) an aliphatic polyamine containing from 2 to 6 carbon atoms and (2) a nuclearly chlorinated aromatic monocarboxylic acid until the reaction mass on continued heating shows no substantial loss in weight.

3. The wax-like heat-reaction product of substantially stoichiometrical proportions of propylene diamine and a halogenated aromatic compound selected from the class consisting of nuclearly halogenated aromatic monocarboxylic and ortho-dicarboxylic acids and acid halides.

4. A composition of matter comprising (1) the wax-like heat-reaction product of an aliphatic diamine and a nuclearly halogenated aromatic monocarboxylic acid halide in the ratio of one mole of the former to about two moles of the latter, and (2) a plasticizer for said reaction product.

5. A wax-like composition of matter comprising (1) the heat-reaction product of propylene diamine and trichlorobenzoyl chloride in the ratio of one mole of the former to about two moles of the latter and (2) from 5 to 25 per cent by weight of a plasticizer for said reaction product based on the weight of said product.

6. A non-inflammable composition of matter comprising (1) a wax-like material obtained by heat-reacting substantially stoichiometrical proportions of a nuclearly chlorinated aromatic ortho-dicarboxylic acid and propylene diamine until the reaction mass exhibits no substantial change in weight on further heating and (2) from 5 to 25 per cent by weight of tricresyl phosphate based on the weight of (1).

7. A synthetic waxy composition comprising (1) the product obtained by heat-reacting trichlorobenzoyl chloride with propylene diamine in a mole ratio such that the diamine is slightly in excess of stoichiometrical proportions until there is no substantial change in weight of the reaction mass on further heating and (2) from 5 to 25 per cent by weight of tricresyl phosphate based on the weight of (1).

8. The process which comprises heat-reacting a halogenated aromatic compound selected from the class consisting of nuclearly halogenated aromatic monocarboxylic and ortho-dicarboxylic acids and acid halides with an aliphatic polyamine in substantially stoichiometrical proportions until the reaction product exhibits no substantial loss in weight on further heating.

9. The process of preparing a synthetic, wax-like composition which comprises heat-reacting an aliphatic polyamine with a nuclearly chlorinated aromatic monocarboxylic acid chloride in substantially stoichiometrical proportions until substantially all of the hydrogen chloride formed during the reaction has been liberated from the reaction mass.

10. The method which comprises initiating reaction between trichlorobenzoyl chloride and propylene diamine, maintaining the reaction temperature between 0° and 50° C. during this initial reaction period, heating the resulting mass to drive off hydrogen chloride retained therein, thereafter adding a further amount of trichlorobenzoyl chloride to the reaction mass, the propylene diamine and the total trichlorobenzoyl chloride being in substantially stoichiometrical proportions, and completing the reaction at a temperature higher than that employed in the prior heating step.

11. The method which comprises effecting reaction under heat between approximately equimolar proportions of tetrachlorophthalic anhydride and propylene diamine while admixed with acetamide until the weight loss coincides with that required for complete reaction between the said anhydride and diamine.

MURRAY M. SPRUNG.